United States Patent
Christensen et al.

(10) Patent No.: US 6,325,170 B2
(45) Date of Patent: *Dec. 4, 2001

(54) HYDRAULIC VEHICLE DRIVE AND VALVE MODULE FOR SAME

(75) Inventors: Jens S. Christensen, Sønderborg; Svend Erik Thomsen, Nordborg, both of (DK)

(73) Assignee: Danfoss Fluid Power A/S, Nordborg (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,810

(22) Filed: Oct. 22, 1998

(30) Foreign Application Priority Data

Nov. 14, 1997 (DE) .............................. 197 50 367

(51) Int. Cl.$^7$ .................................................. B60K 17/356
(52) U.S. Cl. .................... 180/242; 180/247; 180/308; 60/456; 60/468
(58) Field of Search ..................... 180/242, 243, 180/247, 305, 307, 308; 60/464, 468, 456

(56) References Cited

U.S. PATENT DOCUMENTS

| | | | |
|---|---|---|---|
| 3,579,988 | * | 5/1971 | Firth et al. ........................ 180/242 |
| 3,744,244 | * | 7/1973 | Swoager ........................... 60/464 |
| 3,900,075 | * | 8/1975 | Chichester et al. ............... 180/242 |
| 3,918,546 | * | 11/1975 | Chichester et al. ............... 180/243 |
| 3,952,511 | * | 4/1976 | Turner et al. ..................... 180/242 |
| 3,987,768 | * | 10/1976 | Hunck et al. ..................... 180/243 |
| 4,099,588 | * | 7/1978 | Dezelan ........................... 180/242 |
| 4,401,182 | * | 8/1983 | Pollman ........................... 180/242 |
| 4,570,741 | * | 2/1986 | McCoy ............................. 180/242 |
| 4,766,727 | * | 8/1988 | Dull et al. ........................ 180/242 |
| 4,981,159 | | 1/1991 | Christensen ..................... 137/625.69 |
| 5,117,936 | * | 6/1992 | Nakamura et al. ............... 180/242 |
| 5,682,968 | * | 11/1997 | Kalhorn et al. .................. 180/242 |

FOREIGN PATENT DOCUMENTS

| | | |
|---|---|---|
| 38 02 672 | 8/1989 | (DE) . |
| 154326 * | 11/1981 | (JP) ........................... 180/242 |

* cited by examiner

Primary Examiner—Daniel G. DePumpo
(74) Attorney, Agent, or Firm—Lee, Mann, Smith, McWilliams, Sweeney & Ohlson

(57) ABSTRACT

A hydraulic vehicle drive, particularly for mobile hoisting platforms, has a first pair of wheels drivable by first wheel motors in dependence of a first control valve and a second pair of wheels provided with second hydraulic motors. A switching arrangement short-circuits the second hydraulic motors in the driving-free state and for cooling supplies them with a flushing flow. In the driven state a second control valve, in dependence of which the second hydraulic motors are drivable, is activated, and if required connected with the first control valve. Thus, optionally, the first wheel pair can be driven alone or together with a certain driving output from the second wheel pair.

9 Claims, 2 Drawing Sheets

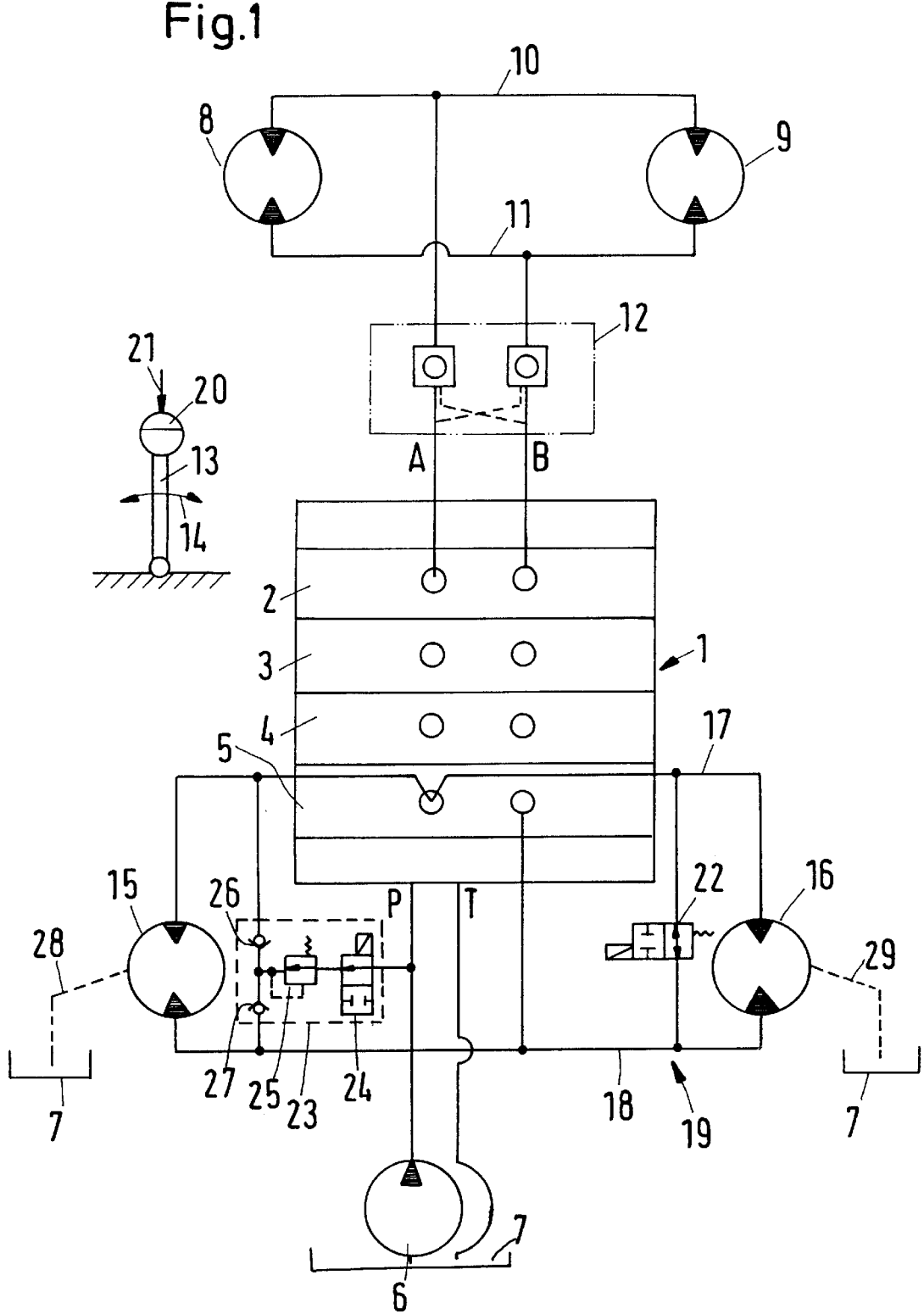

HYDRAULIC VEHICLE DRIVE AND VALVE MODULE FOR SAME

BACKGROUND OF THE INVENTION

The invention concerns a hydraulic vehicle drive, particularly for mobile hoisting platforms, with a first pair of wheels drivable by means of first hydraulic motors in dependence of a first control valve.

Numerous vehicles are available in the market, with either two or four hydraulically driven wheels. The two-wheel drive is suited for simple ground with only small slopes and particularly for indoor use. The four-wheel drive is required for difficult ground with larger slopes or for building sites. Until now the application fields have been limited by the type of driving.

Valve modules with constant flow quantity (flow control) and with constant outlet pressure (pressure control) are known from U.S. Pat. No. 4,981,159, which valve modules have substantially the same design and only differ in a few details. In these valve modules, a compensation valve and a control valve enabling the driving of a motor in both directions are connected in series.

SUMMARY OF THE INVENTION

It is the purpose of the invention to provide a hydraulic vehicle drive of the kind described in the introduction, which permits the optional driving of one pair of wheels, for example the two front wheels, or two pairs of wheels, for example the front and the rear wheels.

According to the invention, this task is solved by means of a second pair of wheels provided with second hydraulic motors and with a switching arrangement, which short-circuits the second hydraulic motors in the driving-free state and, for the purpose of cooling, supplies them with a flushing flow, and in the driven state activates a second control valve in dependence of which the second hydraulic motors are drivable.

By means of the switching arrangement, one pair of wheels can be driven or a second pair of wheels can be connected optionally. In the resting state of the switching arrangement it is provided that the wheels of the second pair can turn freely and that a too strong heat development is prevented. In the connected state the second wheel pair also works, and for this purpose it can, like the first wheel pair, be controlled by, for example, a user.

Preferably, the switching arrangement connects the second control valve with the first control valve. This connection of the two control valves makes the driving of the second wheel pair adapt to that of the first wheel pair. The connection can be mechanical or hydraulic, however, preferably electrical, for example also in the form of a remote control.

Particularly advantageous is that the degree of connection between the first and the second control valve is adjustable. Thus, the user can select the contribution of the second motors to the driving output, if required even dynamically, that is adjustable during operation. The driving output can, for example, be adjusted between 0 and 100% of the output, which the second hydraulic motors would supply at a certain driving output of the first hydraulic motor. At the same time, a very simple steering can be achieved via the connection.

It is favourable that the first control valve is a first valve module with constant flow quantity. Thus, the first wheel pair is driven with a flow quantity, and thus also a speed, which depends on the position of the first control valve.

Further, it is expedient that the second control valve is a second valve module with constant outlet pressure. In the case of a dynamic connection, for example the outlet pressure can be set. When in the connected state the second valve module is active, the second wheel pair not only receives the required flow quantity, but a pressure for creation of a sufficient torque is maintained. The use of valve modules is also an advantage, because the usually available module block, which is provided for all functions (direction control, hoisting and lowering functions, front-wheel drive), merely has to be supplemented by the second valve module required for the four-wheel drive.

Advantageously, it is provided that the main slide of the first control valve is adjustable by means of an operating element and that in the driven state the main slide of the second control valve is adjustable proportional to the main slide of the first control valve. This is a particularly simple way of connecting the two control valves. With a rigid connection the proportionality factor can be fixed and with a dynamic connection the proportionality factor can be adjustable.

Further, it is advantageous that a lever serves as operating element, which lever is pivotal for the adjustment of the first control valve and has a trigger for the operation of the switching arrangement. This gives a very simple handling of the driving arrangement. The trigger can also be used for setting the size of the share of the driving output from the second hydraulic motor, that is, for example, the adjustment of the proportionality factors.

It is also recommended that the switching arrangement have a control valve connecting the two sides of the second hydraulic motors with each other in the driving-free state, however separating them in the driven state. This control valve enables the required short-circuiting of the hydraulic motors in the resting state.

Further, it is advantageous that the second hydraulic motors have a leakage channel and that in the driving-free state of the switching arrangement they are connected with a pump connection via a pressure dependent valve arrangement. Using the leakage channel offers a simple way of realising the flushing flow.

It is a substantial advantage that the second valve module has a compensation valve and a main slide, which has two annular slide slots with axial slots originating from those, and which is arranged in a bore with a central annular pump slot, annular motor slots arranged on both sides of said pump slot, as well as annular tank slots arranged outside said motor slots, the central axial slots having such a length that in the neutral position of the main slide they connect the annular motor slots with the annular pump slot, however separating one of these connections during a displacement. A minor extension of the central axial slot in a valve module for constant outlet pressure causes the annular motor slots to be connected with each other, which leads to the desired short-circuiting of the second hydraulic motors, additionally permitting a certain flushing flow through the second hydraulic motors in connection with the compensation valve.

Additionally, the valve module is a separate commercial unit, which is characterised by a housing with a pump connection, two motor connections and a tank connection as well as a main slide bore having a central annular pump slot connected with the pump connection via a compensation valve, two annular motor slots connected with motor connections being arranged on both sides of said pump slot, and two annular tank slots connected with the tank connection and arranged outside said motor slots, and by a main slide having two annular slide slots with axial slots originating from those, of which the two central axial slots have such a length that in the neutral position of the main slide they connect the annular motor slots with the annular pump slot, however separating one of these connections during a displacement.

BRIEF DESCRIPTION OF THE DRAWING

In the following the invention is described on the basis of preferred embodiments in connection with the drawings, showing:

FIG. 1 a circuit diagram of a vehicle drive according to the invention

DESCRIPTION OF THE PREFERRED EMBODIMENTS

Figure 3:
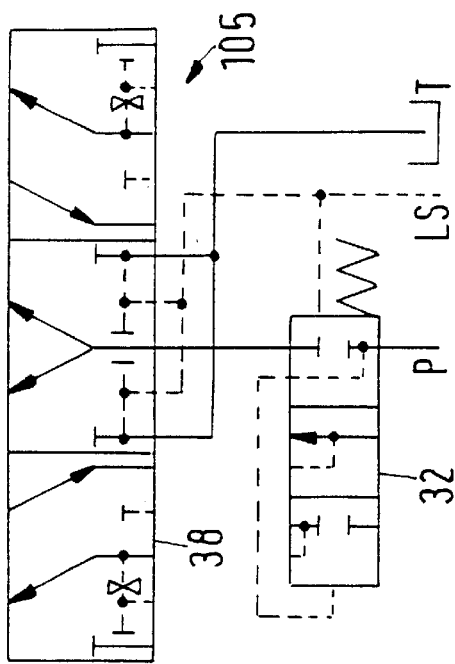
FIG. 3 the circuit diagram of this valve module

The circuit diagram in FIG. 1 shows a valve block 1 with four valve modules 2, 3, 4 and 5. The valve block 1 is supplied with pressure fluid by a pump 6, which is connected with a pump connection P. In the usual way the pump 6 can be driven by an electric motor or a combustion engine. A tank connection T is connected with a tank 7. All valve modules have two motor connections A and B.

A valve module serves as control valve 2 for hydraulic motors 8 and 9, which drive two front wheels. For this purpose the motor connections A and B are connected with motor hoses 10 and 11 via pilot controlled non-return valves 12. They ensure that on an inclined surface the vehicle will remain braked. Due to the inner leakages, it will be practically impossible to reach a complete blocking. Accordingly, an additional mechanical brake will often be provided. The valve module comprises a proportional valve which keeps the set flow quantity constant. The setting is made by means of an operating element 13, here shown as a joystick, which is pivoted in the direction of the arrow 14.

A subsequent valve module serves as control valve 3 for the direction steering, which can, for example, be operated by means of a pivoting movement of the operating element 13 transverse to the direction of the arrow 14. The steering motor required in connection with this is not shown.

A third valve module serves as control valve 4 for an additional steering function, here the hoisting and lowering function of a hoisting platform. This steering can, for example, be triggered by means of a second operating element, which is not shown, as is not the required hoisting motor.

A fourth valve module serves as control valve 5 for two hydraulic motors 15 and 16, which drive two rear wheels. For this purpose the motor connections A and B are connected with the motor hoses 17 and 18. The operation occurs in synchronism with the steering module 2. The control valve 5 is dimensioned for constant output pressure.

Instead of two hydraulic motors per axle, only one motor can be provided.

With regard to the design of such control valves, reference is made to U.S. Pat. No. 4,981,159, in which the FIGS. 1 to 3 and 7 show a control valve with constant flow quantity and the FIGS. 4 to 6 and 8 show a control valve with constant output pressure.

According to the invention, the hydraulic motors 15 and 16 are only intended for optional driving. For this reason a switching device 19 is provided, which is operable by means of a trigger 20, which can be activated in the direction of the arrow 21. In the non-activated state the control valve 5 remains in the neutral position, so that the hydraulic motors 15 and 16 are not driven. In order that the rotors of the motors 15 and 16 can rotate freely, a control valve 22 is provided, which short-circuits the motor hoses 17 and 18. An additional valve arrangement 23 has a control valve 24, a pressure dependent valve 25 and two non-return valves 26 and 27. Via this valve arrangement the two hydraulic motors 15 and 16 receive a small quantity of pump fluid, which can flow off again via the leakage channels 28 and 29 of the hydraulic motors 15 and 16. In this way a cooling is obtained.

The control valves 22, 24 can, for example, be solenoid valves. Depending on the steering, they are open or closed in the de-energised state.

When the trigger 21 is operated, the control valve 5 is functionally connected with the control valve 2, so that they are adjusted proportionally to each other. At the same time the control valves 22 and 24 are brought to their closed position, so that the balancing function and the cooling function are abolished.

The trigger 21 can also be used to set the degree of the connection, that is, the proportionality factor, between the two control valves 2, 5. When, for example, the trigger 21 is pushed further in, the share of the second hydraulic motors 15, 16 to the total driving output increases.

In a third alternative the trigger 21 can also be used for direct control of the hydraulic motors 15, 16. In this case the operating element 13 is, for example, pushed in the direction of the arrow 14, to start driving. If an additional driving output should be required, the trigger 21, which is then made as a proportional element, can be pushed. The more the trigger 21 is pushed, the larger is the torque contribution of the hydraulic motors 15, 16. A connection of the control valves 2,5 is then not absolutely necessary.

The operating element 13 can also have any other form known in practice, for example a foot pedal. For example, the operating element 13 can be connected with regulating units of the control valves 2 to 5 via electrical cables or wirelessly. This remote control is particularly interesting, when the operator stands on a hoisting platform and wants to move this platform to new positions both horizontally and vertically.

Figure 2:
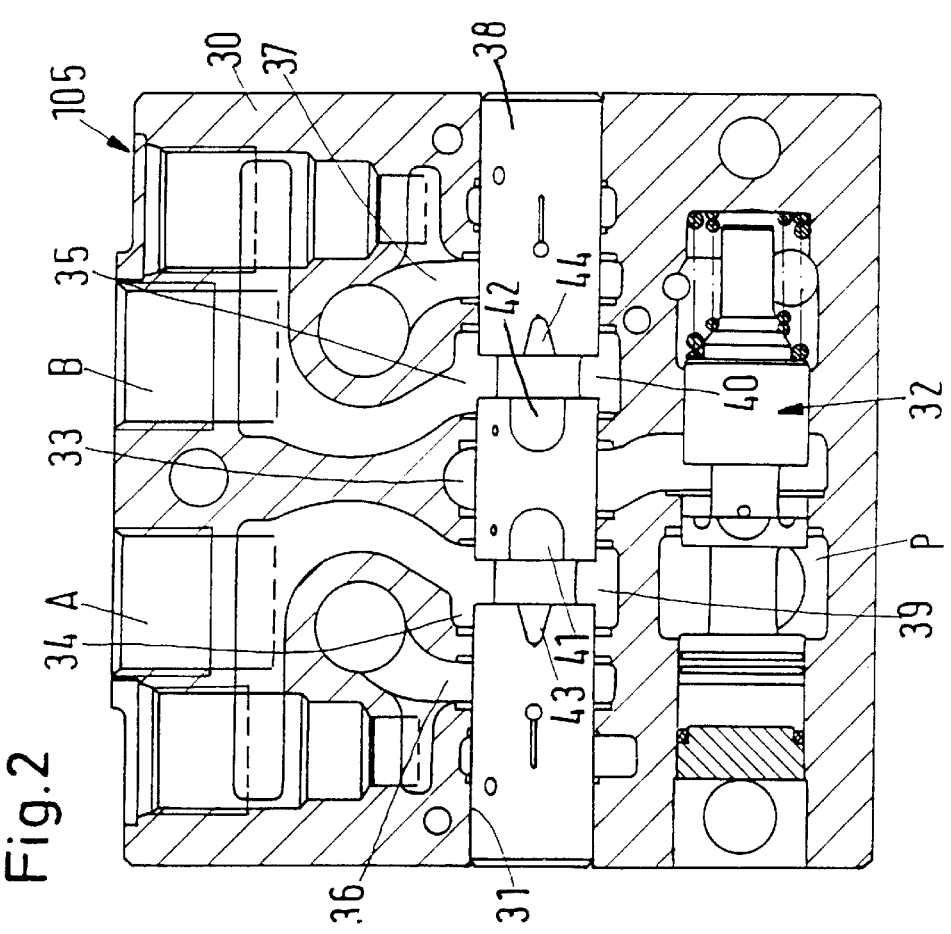
FIG. 2 a section through a valve module applicable according to the invention

FIG. 2 shows a valve module 105 corresponding to the valve module 5, supplying a constant output pressure and also comprising the functions of control valve 22 and valve arrangement 23. A housing has a pump connection P, two motor connections A and B and a not shown tank connection T. A main slide bore 31 has a central annular pump slot 33 connected with the pump connection P via a compensation valve 32, two annular motor slots 34 and 35 arranged on both sides of the annular pump slot and connected with the motor connections A and B, and two annular tank slots 36 and 37 arranged outside the annular motor slots and connected with the tank connection T. A main slide 38 adjustable in the main slide bore 31 by means of not shown regulating units, for example electromagnets, has two annular slide slots 39 and 40. Two central axial slots 41 and 42 and two outer axial slots 43 and 44 originate from these slide slots. These axial slots are made as flat indentations with decreasing depth towards the ends. Further, load pressure sensor openings and channels are provided, which are shown in the circuit diagram in FIG. 3 by means of dotted lines LS and described in detail in U.S. Pat. No. 4,981,159.

A difference in relation to the control valve with constant output pressure known from U.S. Pat. No. 4,981,159 is in this case that the central axial slots 41, 42 have such a length that in the neutral position of the main slide 38 they connect the two annular motor slots 34 and 35 with the annular pump slot 33. Thus the two motor connections A and B and also the two motor hoses 17 and 18 are short-circuited in the neutral position. Further, a small quantity of pump fluid is supplied to the system by means of the compensation valve 32, which flows on via the motor connection carrying lower pressure to the two hydraulic motors 15 and 16, from where it can be drained off via the leakage channels 28 and 29. If, however, by operating the trigger 20 the main slide 38 is brought to a working position, the control valve 105 works as a normal control valve with constant output pressure.

Of course, more axial slots than the two shown, 41 and 42, can be provided. Also their shape can be different from the one shown. The shape and the number can, for example, be selected in dependence of the motor size, the maximum driving speed or similar influencing sizes.

Figure 4:
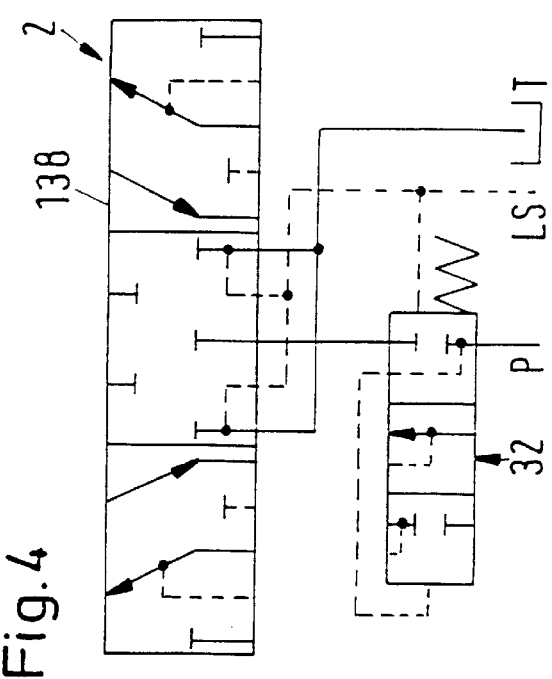
FIG. 4 the circuit diagram for a valve module suited for the two-wheel drive

Finally, FIG. 4 shows the circuit diagram of the control valve 2, which permits the setting of a constant flow quantity. For further details, see U.S. Pat. No. 4,981,159.

What is claimed is:

1. Hydraulic vehicle drive comprising a pump, a first set of wheels driveable by first hydraulic motors and a second set of wheels driveable by second hydraulic motors, and a switching arrangement, the switching arrangement including a valve block comprising a plurality of valve modules and being connected to the pump and the tank, one valve module comprising a first control valve having an operating position for operating the first hydraulic motors, and a second valve module comprising a second control valve having an operating position for operating the second hydraulic motors, the second control valve having a neutral position which short-circuits connections to the second hydraulic motors and supplies a small amount of pump fluid to the second hydraulic motors.

2. Vehicle drive according to claim 1, in which the switching arrangement includes a connection of the second control valve with the first control valve when not in the neutral position.

3. Vehicle drive according to claim 2, in which connection between the first and the second control valve is adjustable.

4. Vehicle drive according to claim 1, in which the first control valve has constant flow.

5. Vehicle drive according to claim 1, in which the second control valve has constant outlet pressure.

6. Vehicle drive according to claim 1, in which the first control valve includes a main slide and the second control valve includes a main slide, the main slide of the first control valve being adjustable by means of an operating element and the main slide of the second control valve being adjustable in relation to the main slide of the first control valve.

7. Vehicle drive according to claim 1, in which the switching arrangement includes a control valve which short-circuits the second hydraulic motors when the second control valve is in the neutral position.

8. Vehicle drive according to claim 1, in which the second hydraulic motors each have a leakage channel and in the neutral position of the second control valve the second hydraulic motors are connected with a pump connection via a pressure dependent valve arrangement.

9. Vehicle drive according to claim 1, in which the second valve module includes a compensation valve and a main slide, the main slide having two annular slide slots with axial slots extending from the annular slide slots, the main slide being located in a bore having a central annular pump slot, annular motor slots being located on both sides of said pump slot, and annular tank slots being located outside said motor slots, at least two of the axial slots having a length such that in a neutral position of the main slide the two axial slots connect the annular motor slots with the annular pump slot, and in a displaced position of the main slide the two axial slots separate one of these connections.

* * * * *